(12) United States Patent
Tseng et al.

(10) Patent No.: US 11,547,999 B2
(45) Date of Patent: Jan. 10, 2023

(54) CELL CHIP AND DYNAMIC DIALYSIS STAINING FOR CELLS

(71) Applicant: National Tsing Hua University, Hsinchu (TW)

(72) Inventors: Fan-Gang Tseng, Hsinchu (TW); Jen-Kuei Wu, Hsinchu (TW)

(73) Assignee: National Tsing Hua University, Hsinchu (TW)

( * ) Notice: Subject to any disclaimer, the term of this patent is extended or adjusted under 35 U.S.C. 154(b) by 317 days.

(21) Appl. No.: 16/795,511

(22) Filed: Feb. 19, 2020

(65) Prior Publication Data

US 2020/0215542 A1 Jul. 9, 2020

Related U.S. Application Data

(63) Continuation-in-part of application No. 15/584,991, filed on May 2, 2017, now abandoned.

(30) Foreign Application Priority Data

Feb. 13, 2017 (TW) ................................ 106104562

(51) Int. Cl.
*B01L 3/00* (2006.01)
*B01L 99/00* (2010.01)
*G01N 1/30* (2006.01)

(52) U.S. Cl.
CPC .......... *B01L 3/502715* (2013.01); *G01N 1/30* (2013.01); *B01L 2200/16* (2013.01); *B01L 2300/0681* (2013.01); *B01L 2300/0819* (2013.01); *B01L 2300/12* (2013.01)

(58) Field of Classification Search
CPC ........ B01L 2200/0652; B01L 2200/12; B01L 2200/16; B01L 2300/0681; B01L 2300/0816; B01L 2300/0819; B01L 2300/0887; B01L 2300/12; B01L 3/502715; B01L 3/502761; G01N 1/30; G01N 33/525; B01D 61/00; C12M 23/16; C12N 2503/00

See application file for complete search history.

*Primary Examiner* — Lydia Edwards
(74) *Attorney, Agent, or Firm* — JCIPRNET

(57) ABSTRACT

A cell chip includes first, second and third elements, a dye dialysis layer, a micro-channel structure and washing solution inlet and outlet. The first element has a first hole and second holes at opposite sides of the first hole. The second element has a third hole corresponding to the first hole and fourth holes corresponding to the second holes. The dye dialysis layer is inserted between the first element and the second element and has a cell-assembly region corresponding to the first and third holes. The micro-channel structure is disposed below the cell-assembly region and between the second and the third elements. The washing solution inlet and outlet are communicatively connected to the micro-channel structure. The washing solution inlet includes the second hole and a corresponding fourth hole. A washing solution flows in the micro-channel structure through the washing solution inlet and outlet.

19 Claims, 14 Drawing Sheets

CELL CHIP AND DYNAMIC DIALYSIS STAINING FOR CELLS

CROSS-REFERENCE TO RELATED APPLICATION

This application is a continuation-in-part application of and claims priority benefit of U.S. application Ser. No. 15/584,991, filed on May 2, 2017, now pending, which claims the priority benefit of Taiwan application serial no. 106104562, filed on Feb. 13, 2017. The entirety of each of the above-mentioned patent applications is hereby incorporated by reference herein and made a part of this specification.

BACKGROUND OF THE INVENTION

Field of the Invention

The invention relates to a chip, and particularly relates to a cell chip.

Description of Related Art

The observation and cultivation of specific cells are the most basic and most important parts in bio-medical research. The existing way to observe the cells is mostly based on the use of microscopy including the optical microscopy and the fluorescence microscopy. However, a large number of cells in high density are easily stacked together to form multi-layered cells. The multilayered cells may cause signal shadowing to generate wrong determination, so as to result in detection errors. Thus, to avoid the detection errors, the cells need to be arranged in a single-layer array.

For instance, in the detection of trace cells, the number of circulating tumor cells (CTCs) is positively correlated with the survival rate and the condition of cancer patients. Thus, the detection and counting of the circulating tumor cells are very important for cancer treatment. However, the currently used detection chip has disadvantages that the cells are liable to stack and the step of cell staining is complicated, which leads to cell loss and death. Thus, it is urgent to develop a cell chip which can simultaneously make the cells be arranged in a single layer manner and improve the efficiency of staining cells in this field.

SUMMARY OF THE INVENTION

The invention provides a cell chip which can make cells be self-assembled arranged in a single layer manner and be rapidly dyed.

The invention also provides a dynamic dialysis staining for cells to rapidly dye the cells.

The invention provides a cell chip including a first element, a second element, a third element, a dye dialysis layer, a micro-channel structure a washing solution inlet and a washing solution outlet. The first element has at least one first hole and a plurality of second holes at opposite sides of the at least one first hole. The second element has at least one third hole corresponding to the at least one first hole and a plurality of fourth holes corresponding to the plurality of second holes. The second element is disposed between the first element and the third element. The dye dialysis layer is inserted between the first element and the second element. The dye dialysis layer has a cell-assembly region corresponding to the at least one first hole and the at least one third hole. The cell-assembly region is configured to contain a sample solution containing a plurality of cells. The micro-channel structure is disposed below the cell-assembly region and between the second element and the third element. The washing solution inlet is communicatively connected to the micro-channel structure. The washing solution inlet includes one of the plurality of second holes and a corresponding one of the plurality of fourth holes. The washing solution outlet is communicatively connected to the micro-channel structure. When a dye enters into the cell-assembly region via the dye dialysis layer, the dye diffuses from the cell-assembly region to the micro-channel structure since there is a concentration difference between the dye and a washing solution flowing in the micro-channel structure through the washing solution inlet and the washing solution outlet, and thus the cells are dyed by the dye. In addition, the washing solution passes in and out via the dye dialysis layer to accelerate the diffusion of the dye, so as to achieve dynamic dialysis staining.

The invention provides a dynamic dialysis staining for cells including the following steps. The cell chip is provided. A sample solution containing a plurality of cells into the cell-assembly region of the cell chip via the at least one first hole. A dye is dropped into the cell-assembly region of the cell chip via the at least one first hole to be in contact with the cells. When dropping the dye, a washing solution flows in the micro-channel structure of the cell chip, the dye diffuses from the cell-assembly region to the micro-channel structure since there is a concentration difference between the dye and the washing solution flowing in the micro-channel structure, and thus the cells are dyed by the dye. In addition, the washing solution passes in and out the cell chip via the dye dialysis layer to accelerate the diffusion of the dye, so as to achieve dynamic dialysis staining.

According to an embodiment of the invention, the first element, the second element and the third element are respectively an injection molded element.

According to an embodiment of the invention, the first element, the second element and the third element are respectively an integrally formed element.

According to an embodiment of the invention, the washing solution inlet penetrates the third element.

According to an embodiment of the invention, the third element includes an inner part and an outer part surrounding the inner part, and a thickness of the outer part is larger than a thickness of the inner part.

According to an embodiment of the invention, a height of the micro-channel structure is substantially the same as a thickness difference between the outer part and the inner part of the third element.

According to an embodiment of the invention, the third element further includes a plurality of alignment parts disposed on the inner part.

According to an embodiment of the invention, the first element includes a first engagement part, the second element includes a second engagement part, and the first element and the second element are assembled by engaging the first engagement part and the second engagement part.

According to an embodiment of the invention, the first engagement part and the second engagement part are a protrusion and a groove.

According to an embodiment of the invention, the second element includes a third engagement part, the third element includes a fourth engagement part, and the second element and the third element are assembled by engaging the third engagement part and the fourth engagement part.

According to an embodiment of the invention, the third engagement part and the fourth engagement part are a protrusion and a groove.

According to an embodiment of the invention, a pore diameter of the dye dialysis layer is smaller than a diameter of the cells.

According to an embodiment of the invention, the plurality of second holes are disposed at four corners of the first element to surround the at least one first hole.

According to an embodiment of the invention, a material of the dye dialysis layer includes a photoresist.

According to an embodiment of the invention, the at least one first hole is a circular hole.

According to an embodiment of the invention, a method that a washing solution flows in the micro-channel structure of the cell chip includes making the washing solution be injected into the micro-channel structure and exhausted from the micro-channel structure continuously.

According to an embodiment of the invention, after dropping a sample solution containing a plurality of cells into the cell-assembly region of the cell chip via the at least one first hole, the method further includes sucking a liquid portion of the sample solution via at least one of the plurality of second holes and a corresponding one of the plurality of fourth holes, so that the cells are arranged on the cell-assembly region in a single layer manner.

Based on the above, by the combination of the dye dialysis layer with the holes and the micro-channel structure, the cell chip of the invention has both the functions of cell self-assembled arrangement and cell staining. Furthermore, since the cell staining is achieved by diffusion and dynamic dialysis, compared with the principle of density gradient centrifugation with high speed rotation used in the current centrifuges, the invention not only is relatively mild to maintain high viability of the cells, so that the detected cells can be used for subsequent culture, but the cell staining time can be significantly decreased to achieve high efficiency dynamic staining for cells. Additionally, before the cell staining is performed, the cells have been arranged in a single-layer array on the dye dialysis layer. Thus, the phenomenon of multilayered cells can be eliminated, so that the image interpretation is more accurate.

In order to make the aforementioned features and advantages of the disclosure more comprehensible, embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1A:
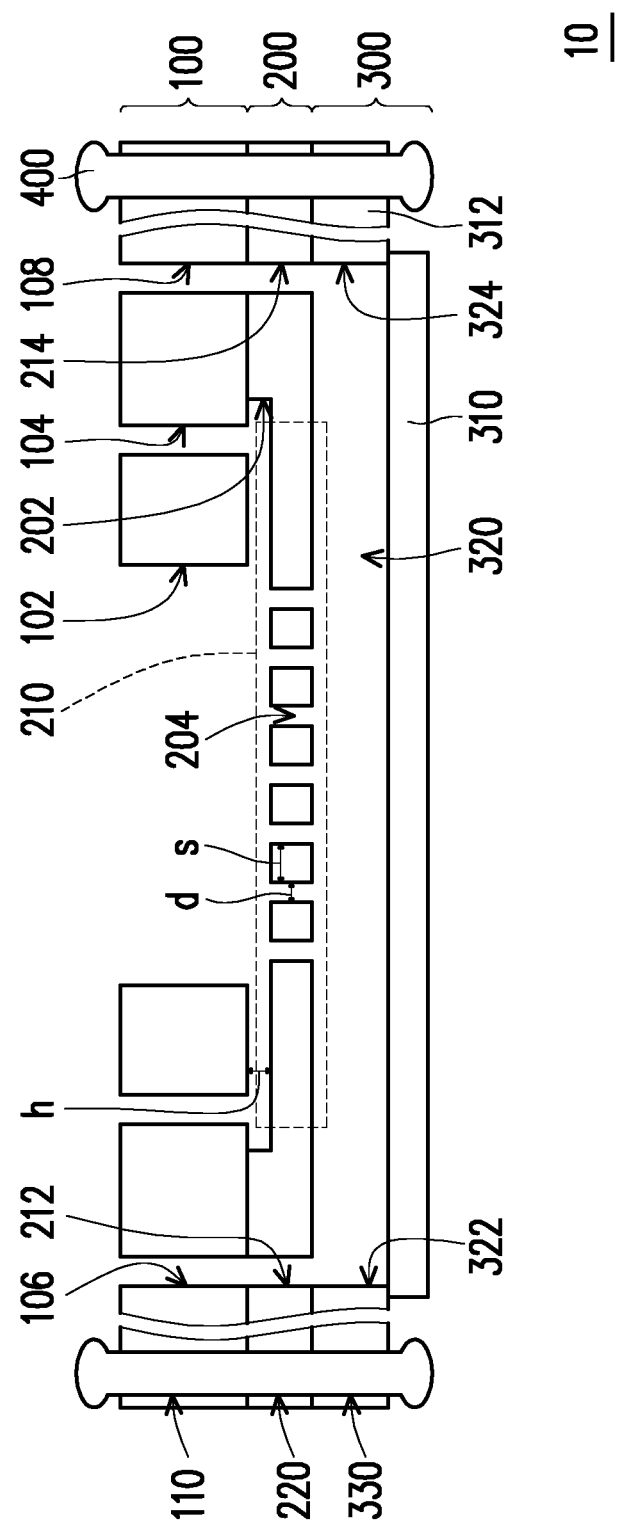
FIG. 1A is a schematic diagram of a cell chip according to an embodiment of the invention.

In the following detailed description, for purposes of explanation, numerous specific details are set forth in order to provide a thorough understanding of the disclosed embodiments.

It will be apparent, however, that one or more embodiments may be practiced without these specific details. In other instances, well-known structures and devices are schematically shown in order to simplify the drawing.

Figure 1B:
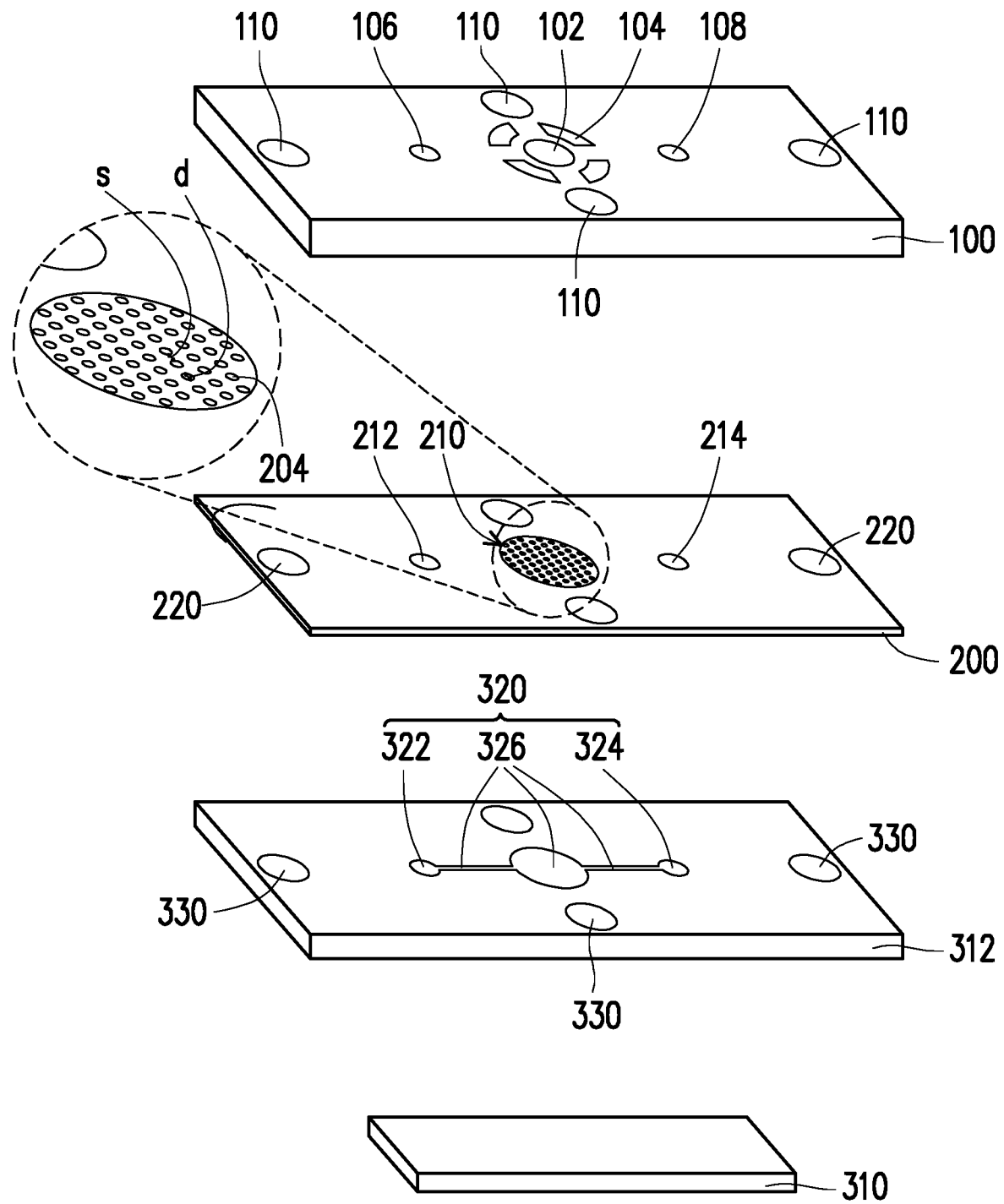
FIG. 1B is an explosion schematic diagram of the cell chip of FIG. 1A.

FIG. 1 is a schematic diagram of a cell chip according to an embodiment of the invention, and FIG. 1B is an explosion schematic diagram of the cell chip of FIG. 1A. Referring to FIG. 1A and FIG. 1B at the same time, a cell chip 10 includes a first substrate 100, a dye dialysis layer 200 and a second substrate 300.

The first substrate 100 has at least one first hole 102 configured as an injection port of a sample solution. In the embodiment, the sample solution is a cell suspension containing an appropriate number of cells, for example. The first substrate 100 further includes at least one evaporation hole 104, for example. In the embodiment, the first substrate 100 including a plurality of evaporation holes 104 is used as an example. The evaporation holes 104 have a lenticular shape, for example, and are arranged around the first hole 102 in a circular manner, but the invention is not limited thereto. A size of the first hole 102 is 3 mm to 6 mm, for example. In the embodiment, the first substrate 100 may further include a washing solution inlet 106 and a washing solution outlet 108 located at two opposite sides of the first hole 102, such as located at two opposite sides of the first substrate 100. The washing solution inlet 106 and the washing solution outlet 108 are connected with a syringe pump, for example. In the embodiment, the first substrate 100 may further include at least one pair of fixing element containing holes 110 located at two opposite sides of the first substrate 100 and symmetrically disposed to each other. In the embodiment, the first substrate 100 having four fixing element containing holes 110 is used as an example, but the invention is not limited thereto. A material of the first substrate 100 may be a plastic material, such as polymethylmethacrylate (PMMA). In an embodiment, an upper surface of the first substrate 100 and an inner wall surface of the first hole 102 preferably have an anti-adhesion layer (not shown), such as tridecafluoro-1,1,2,2-tetrahydrooctyl trichlorosilane (FOTS), configured to prevent the overflow of the sample solution or the loss of cells caused by that the cells in the sample solution are adhered onto the first substrate 100. It should be noted that, the invention does not limit the numbers, shapes and configurations of the first hole 102, the evaporation hole 104 and the fixing element containing hole 110.

The dye dialysis layer 200 is located between the first substrate 100 and the second substrate 300. The dye dialysis layer 200 has a cell-assembly region 210. The cell-assembly region 210 is disposed corresponding to the first hole 102 and separated from the first substrate 100 by a spacing h. The spacing h is smaller than a particle size of the cell (or an average particle size of multiple cells), for example. In the embodiment, the spacing h is smaller than or equal to 5 μm, for example. Specifically, the dye dialysis layer 200 has a groove 202. The groove 202 is disposed corresponding to the cell-assembly region 210. The cell-assembly region 210 includes a plurality of second holes 204. The second holes 204 are arranged in an array, for example. In the embodiment, a size d of the second hole 204 is smaller than the particle size of the cell (or the average particle size of multiple cells), such as smaller than or equal to 7 μm. A spacing s between the second holes 204 is larger than the size d of the second hole 204, for example. The spacing s between the second holes 204 is, for example, between 10 μm and 30 μm, such as 20 μm. In the embodiment, the dye dialysis layer 200 having a circular shape is used as an example, but the invention is not limited thereto. In the embodiment, an area of the dye dialysis layer 200 is equal to or larger than an area of the first hole 102, for example. A material of the dye dialysis layer 200 may be a material having a high light transmittance and a high biocompatibility, such as polydimethylsiloxane (PDMS). A thickness of the dye dialysis layer 200 is between 30 μm and 50 μm, such as 40 μm.

In the embodiment, a size of the dye dialysis layer 200 is larger than or equal to that of the first substrate 100, for example. Thus, the dye dialysis layer 200 may further include a washing solution inlet 212, a washing solution outlet 214 and a fixing element containing hole 220 respectively disposed corresponding to the washing solution inlet 106, the washing solution outlet 108 and the fixing element containing hole 110 of the first substrate 100. In another embodiment, when the size of the dye dialysis layer 200 is smaller than that of the first substrate 100, the configurations of the washing solution inlet 212, the washing solution outlet 214 and the fixing element containing hole 220 may be omitted. In other words, the dye dialysis layer 200 may be directly mounted on the second substrate 300 and clamped between the first substrate 100 and the second substrate 300 by clamping the first substrate 100 and the second substrate 300.

In the embodiment, a method of forming the dye dialysis layer 200 includes the following steps, for example. First, a substrate (not shown) is provided, and a photolithography process is performed on the substrate to form a plurality of columns arranged in array as a master mold. The substrate is a silicon wafer, for example. A material of the columns is, for example, a negative photoresist, such as SU-8. Next, a dye dialysis material is injected into a surface of the substrate and filled in gaps between the columns. After the dye dialysis material is cured, the mold is turned over to obtain the dye dialysis layer 200 having a plurality of second holes. Then, the dye dialysis layer 200 is peeled off from the substrate and the master mold. In the embodiment, the dye dialysis material is polydimethylsiloxane, for example. A method of curing the dye dialysis material is a heating method, for example.

The second substrate 300 has a micro-channel structure 320. In the embodiment, the second substrate 300 includes a third substrate 310 and a fourth substrate 312, for example. The fourth substrate 312 is located between the third substrate 310 and the dye dialysis layer 200. The fourth substrate 312 includes a micro-channel opening penetrating the fourth substrate 312, for example, and the third substrate 310 thereneath is used as a base plate to form a micro-channel structure 320 having a containing space. That is, when the fourth substrate 312 is superimposed on the third substrate 310, the micro-channel opening of the fourth substrate 312 will expose the third substrate 310. The micro-channel structure 320 having the containing space is formed by combining the third substrate 310 with the fourth substrate 312. In the embodiment, the micro-channel structure 320 includes a washing solution inlet 322, a washing solution outlet 324 and a micro-channel 326 located between the washing solution inlet 322 and the washing solution outlet 324. The washing solution inlet 322 and the washing solution outlet 324 are respectively communicated with the washing solution inlet 106 and the washing solution outlet 108, for example. The micro-channel 326 has a region corresponding to the dye dialysis layer 200. Specifically, the region of the micro-channel 326 is larger than or equal to the cell-assembly region 210 and both the two coincide with each other, for example. In the embodiment, the region of the micro-channel 326 is larger than or equal to the first hole 102 in the first substrate 100, for example.

In the embodiment, the fourth substrate 312 further includes at least one pair of fixing element containing holes 330 disposed corresponding to the fixing element containing holes 110 of the first substrate 100, for example. In the embodiment, the fourth substrate 312 having four fixing element containing holes 330 is used as an example, but the invention is not limited thereto. The third substrate 310 is a high light transmissive substrate which facilitates optical observation, such as a glass substrate. A material of the fourth substrate 312 may be a plastic material, such as polymethylmethacrylate. In the embodiment, the third substrate 310 and the fourth substrate 312 are bonded by an adhesion layer, such as an AB gel, for example. In another embodiment, the groove (the groove does not penetrate the substrate) used as the micro-channel structure may be directly formed in the high light transmissive substrate, and thus one of the third substrate and the fourth substrate may be omitted.

In the embodiment, the first substrate 100 and the fourth substrate 312 have an appropriate thickness. The thickness of the first substrate 100 is used as a placement region for the sample solution to provide a sufficient volume for the solution required by the dynamic dialysis diffusion. The fourth substrate is used as a channel for the flow of the dynamic dialysis solution, and the thickness thereof should not be too thick for optical system focal length detection. At the same time, a material of the first substrate 100 and the fourth substrate 312 has a high light transmittance conductive to the observation of optical system, such as an optical microscope or a fluorescence microscope. In the embodiment, the thickness of the first substrate 100 is larger than the thickness of the fourth substrate 312, for example. The thickness of the first substrate 100 is between 4 mm and 6 mm, for example, and the thickness of the fourth substrate 312 is between 1 mm and 4 mm, for example.

In the embodiment, the cell chip 10 further includes at least two fixing elements 400 to clamp and fix the first substrate 100 and the second substrate 300, for example, so that the dye dialysis layer 200 is clamped between the first substrate 100 and the second substrate 300, and the spacing h between the first substrate 100 and the dye dialysis layer 200 is precisely controlled. Therefore, the assembly of the cell chip 10 is completed. The fixing element 400 may be a screw or other elements, but the invention is not limited thereto. After the first substrate 100, the dye dialysis layer 200 and the second substrate 300 are assembled, the dye dialysis layer 200 is suspended above the micro-channel structure 320.

Figure 2A:
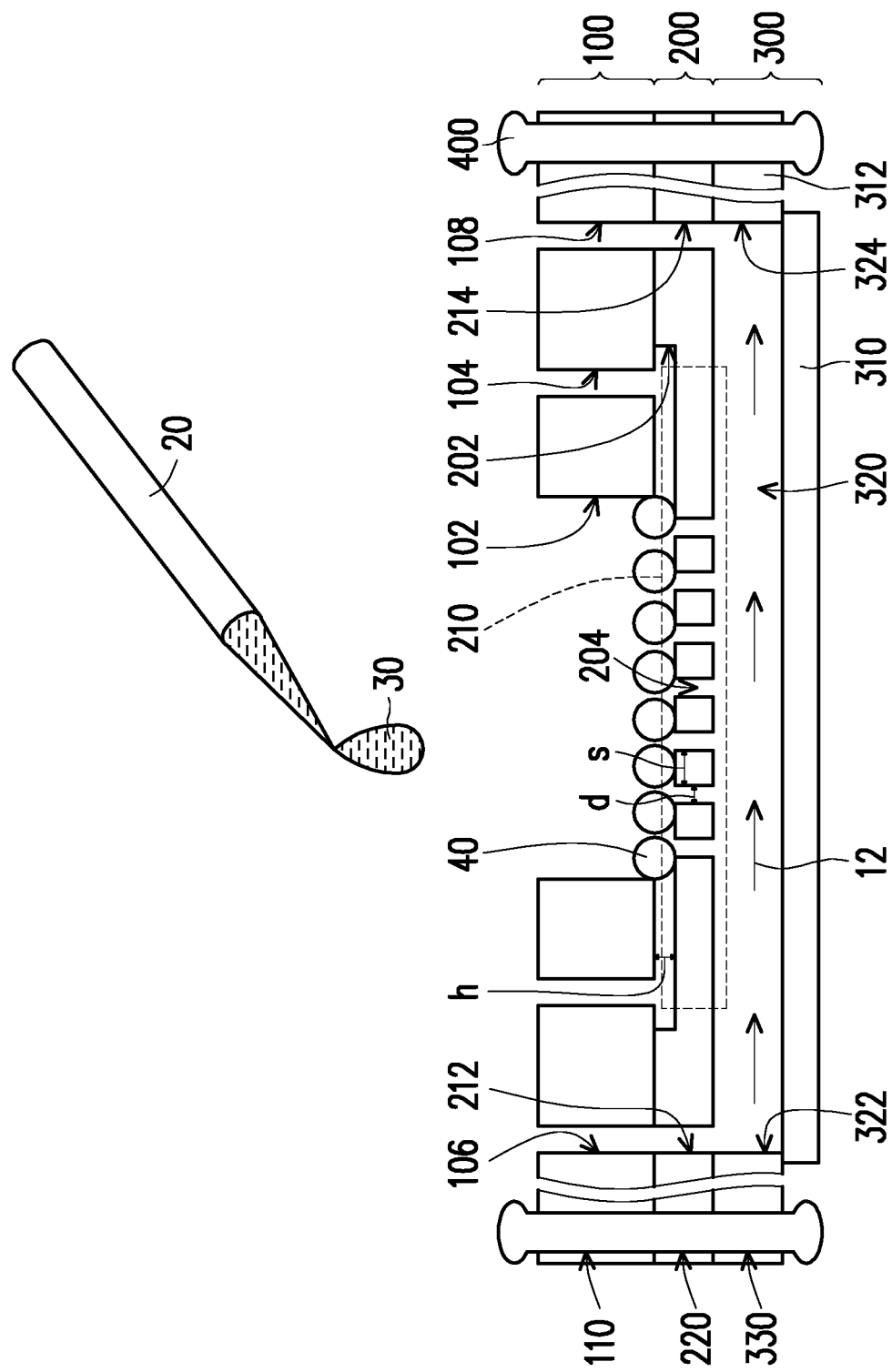
FIG. 2A and FIG. 2B are schematic flow diagrams of a use method for a cell chip according to an embodiment of the invention.
Figure 2B:
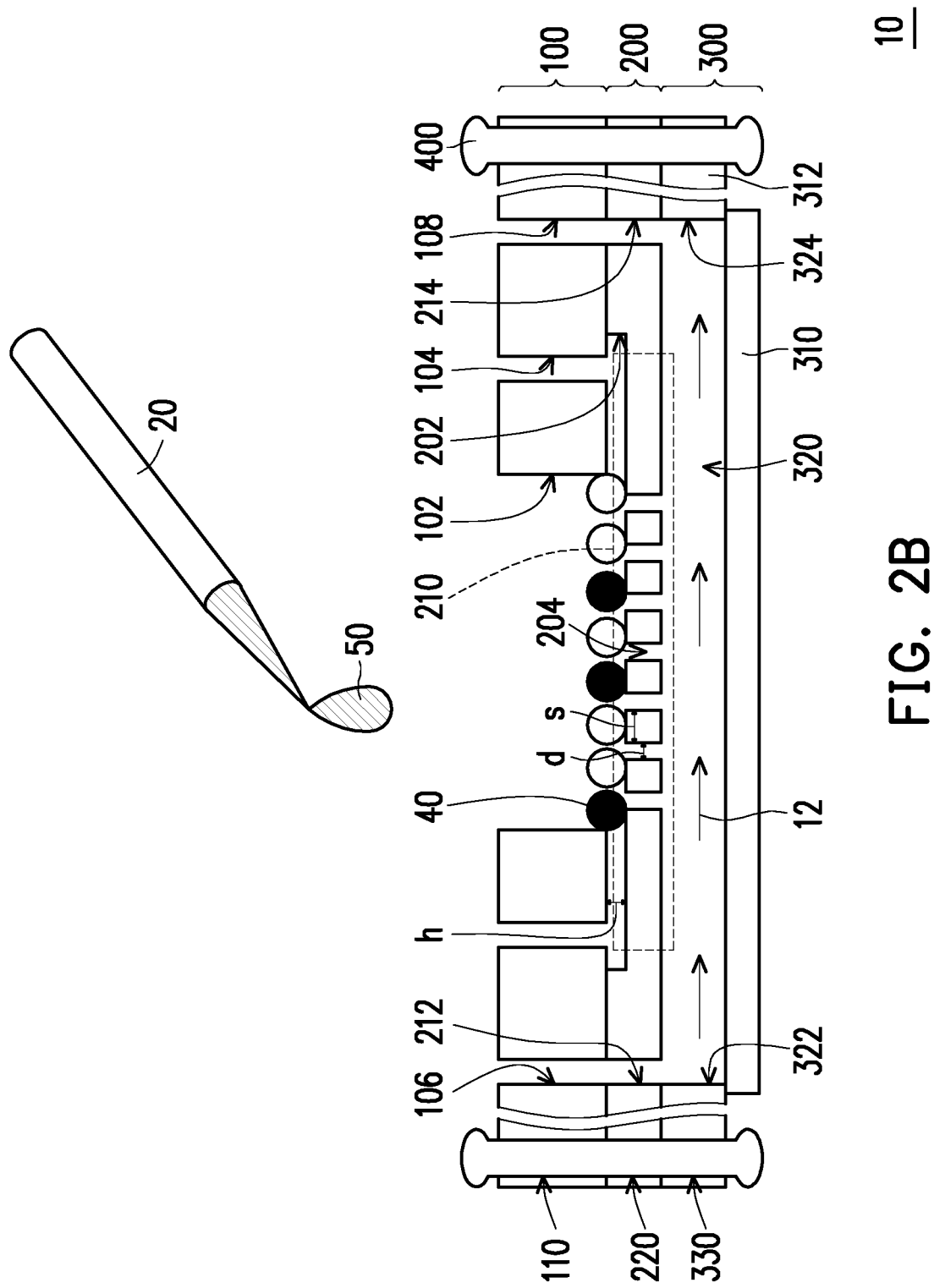

FIG. 2A and FIG. 2B are schematic flow diagrams of a use method for a cell chip according to an embodiment of the invention. Referring to FIG. 2A, first, the cell chip 10 is provided. In the embodiment, after the cell chip 10 is provided, the step of establishing a micro-channel system may be performed. That is, a washing solution 12 is injected into the micro-channel structure 320 of the second substrate 300, so that the washing solution 12 continues to flow in the micro-channel structure 320 of the cell chip 10. The washing solution 12 is a colorless buffer solution, such as phosphate buffered saline (PBS), for example. In the embodiment, the washing solution 12 may be continuously injected into the micro-channel structure 320 via the washing solution inlet 106 and exhausted from the micro-channel structure 320 via the washing solution outlet 108 by a device, such as a syringe pump (not shown).

Next, a sample solution 30 containing a plurality of cells 40 is dropped into the cell-assembly region 210 of the cell chip 10 via the first hole 102. For instance, the sample solution 30, such as a cell suspension, is sampled by a dropper 20 or a pipetman, and the sample solution 30 is added into the cell chip 10 via the first hole 102. The cells 40 of the sample solution 30 are settled down to the cell-assembly region 210 of the dye dialysis layer 200 by the gravity of the solution and the cells 40 themselves. In the embodiment, the cells 40 are arranged onto the cell-assembly region 210 of the dye dialysis layer 200 in a single layer manner by the lateral tensile force of the evaporation of the solution from the evaporation hole 104, for example, and the solution of the suspension enters into the micro-channel structure 320 via the second hole 204. In an embodiment, it further includes directly sucking a liquid portion of the sample solution 30 from the evaporation hole 104 to increase the lateral tensile force, thereby accelerating the cells 40 to be arranged onto the cell-assembly region 210 in a single layer manner. Therefore, the cells 40 in the sample solution 30 are arranged in an array in the cell-assembly region 210 in a self-assembly method to complete the self-assembly with high density cell array. Additionally, it should be mentioned that, the size d of the second hole 204 is designed to be smaller than the particle size of the cells 40, and thus the dye dialysis layer 200 may prevent the cells from flowing out from the second holes 204, so that the loss of the cell number can be avoided, and the liquid such as the liquid portion of the sample solution 30 and the dye diffuses via the channel of the dye dialysis layer.

Referring to FIG. 2B, next, a dye 50 is dropped into the cell-assembly region 210 of the cell chip 10 via the first hole 102 to be in contact with the cells 40. While dropping the dye 50, the washing solution 12 flows in the micro-channel structure 320 of the cell chip 10. For instance, the dye 50, such as an immunofluorescent dye, is sampled by a dropper 20 or a pipetman, for example. The dye 50 is added into the cell chip 10 via the first hole 102, so that the dye 50 flows through the cell-assembly region 210 to be in contact with the cells 40 to dye the cells 40. The dye 50 diffuses from the cell-assembly region 210 to the micro-channel structure 320 due to a concentration difference between the dye 50 and the washing solution 12 flowing in the micro-channel structure 320. Thereby, the cells 40 are dyed by the dye 50. The aforementioned concentration difference means not only the concentration difference between the dye just dropped into the cell-assembly region 210 and the washing solution 12 in the micro-channel structure 320, but also the concentration difference between the dye which has been drooped into the cell-assembly region 210 and the dye which has entered into the micro-channel structure 320 to be diluted by the washing solution 12. Additionally, in the embodiment, the washing solution 12 which enters into the micro-channel structure 320 continuously flows in and out the second holes 204 of the dye dialysis layer 200 to accelerate the diffusion of the dye, so as to achieve dynamic dialysis staining.

The staining speed of the cells can be significantly accelerated, such as the time of traditional staining is shortened, by the diffusion of the dye and the dynamic dialysis staining method of continuously flowing the washing solution in the micro-channel, so as to complete the cell staining with high efficiency. In the embodiment, the washing solution 12 continuously flowing in the micro-channel structure 320 of the cell chip 10 before dropping the dye 50 is used as an example, but the invention is not limited thereto. In other embodiments, the washing solution 12 may continuously flow in the micro-channel structure 320 of the cell chip 10 while or after dropping the dye 50. It should be mentioned that, if the sample solution is to be specific detected or tested, the sample solution needs to be pretreated prior to the use of the cell chip 10, so as to avoid the additional processing process interfering the cell self-assembly array. Furthermore, to avoid foreign substances affecting cell staining, the cell chip 10 may be covered with an upper cover (not shown) thereon to block the first hole 102.

Then, after the cells 40 are dyed for an appropriate period of time, the cell chip 10 is placed under the optical microscope or the fluorescence microscope to be observed. Since the cells 40 are arranged in an array on the cell-assembly region 210 in a single layer manner before dyeing, the phenomenon of multilayered cells can be eliminated under the observation of the microscope, so that the image interpretation is more accurate.

Figure 3A:
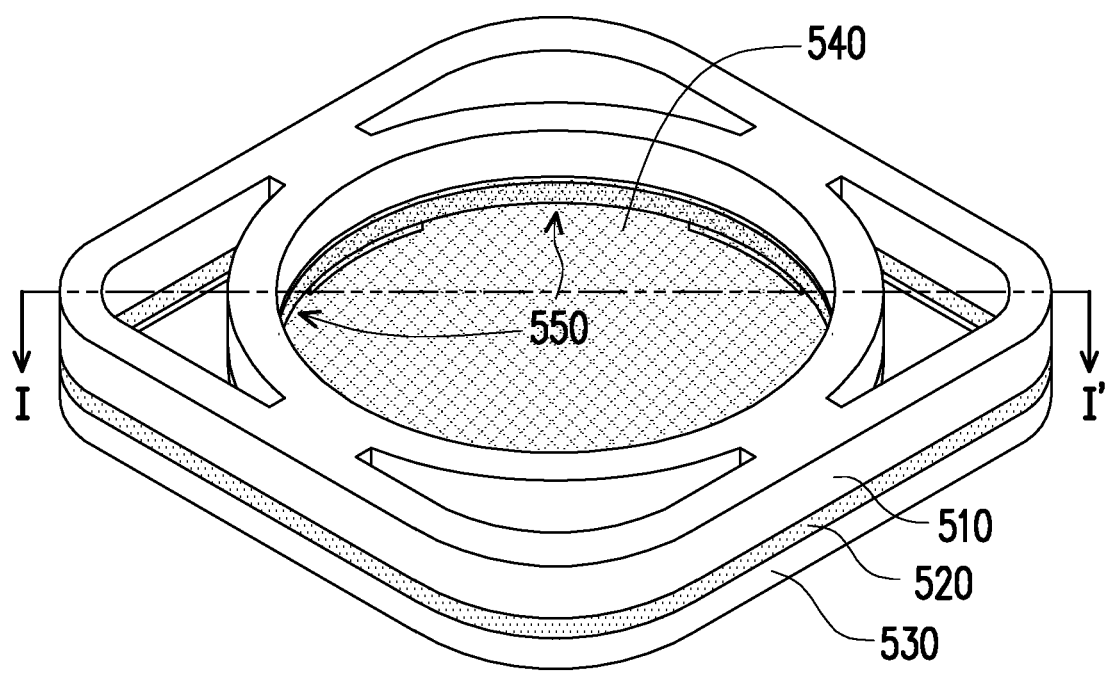
FIG. 3A is a schematic diagram of a cell chip according to an embodiment of the invention.
Figure 3B:
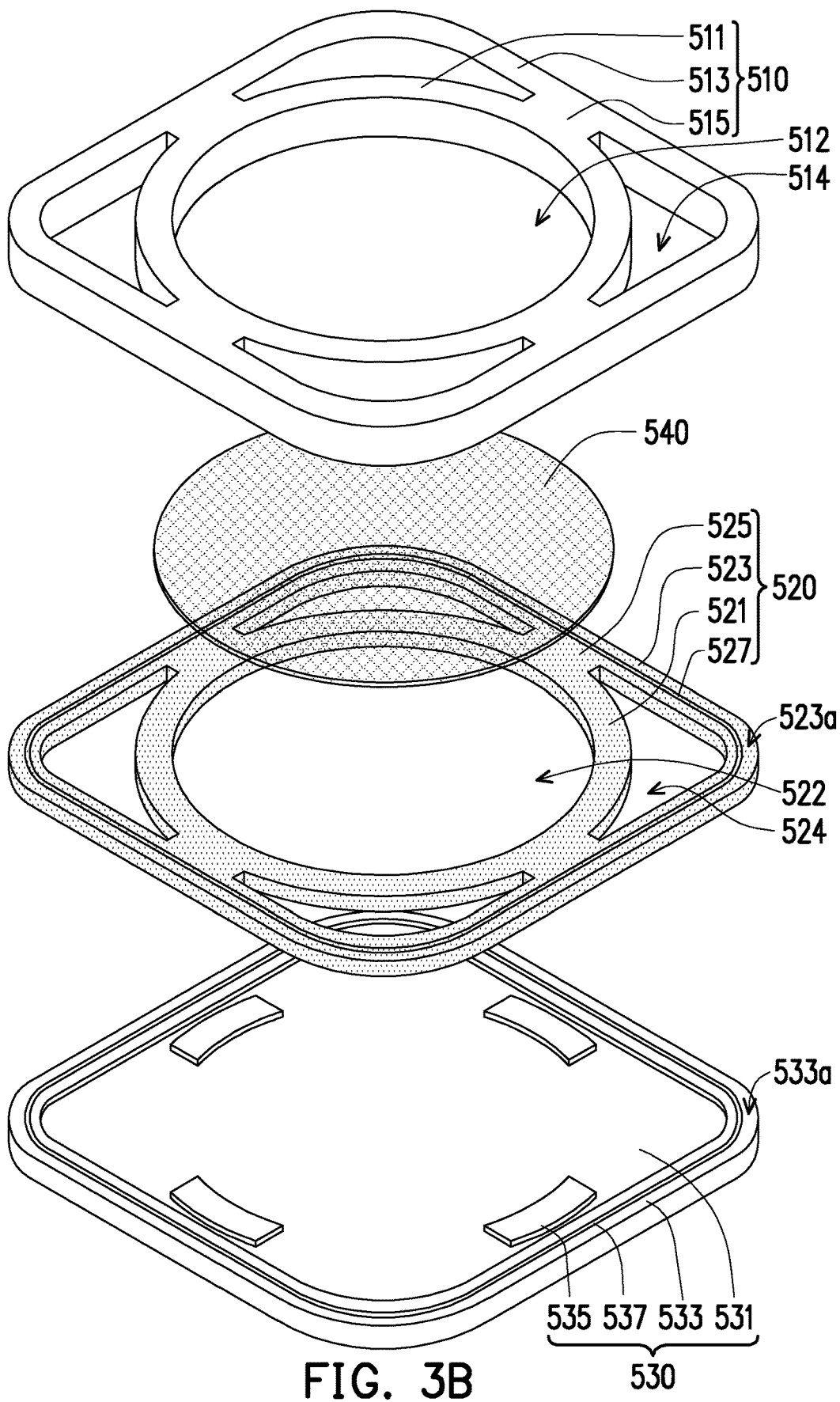
FIG. 3B is an explosion schematic diagram of the cell chip of FIG. 3A.
Figure 3C:
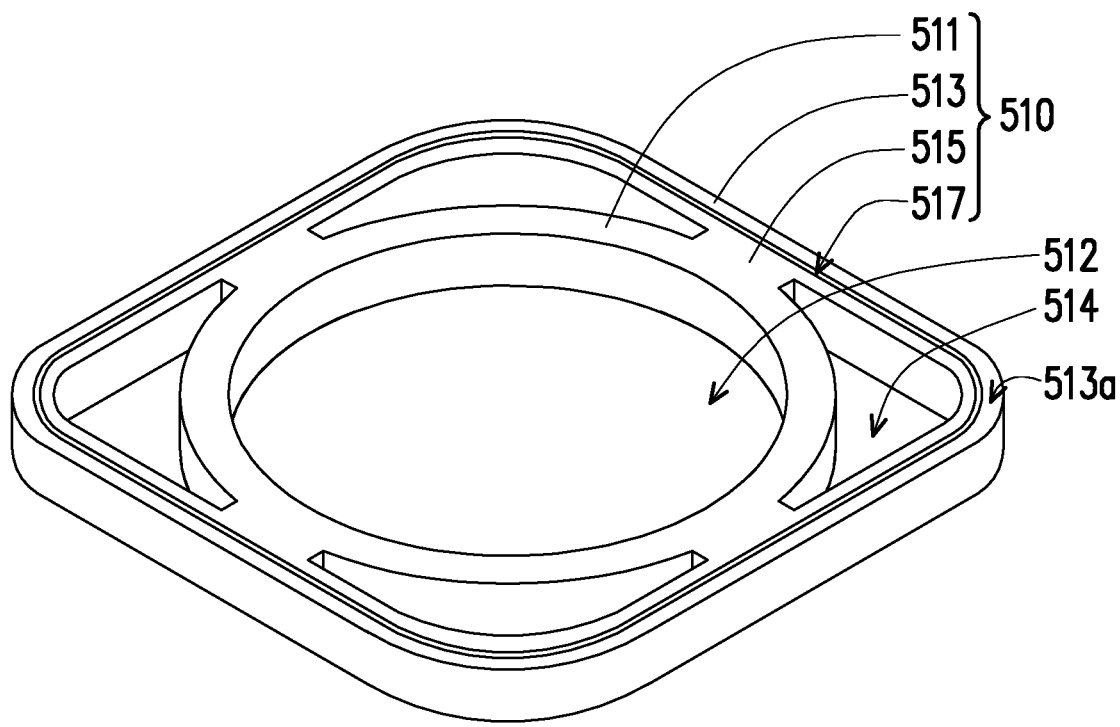
FIG. 3C is a bottom view of a first element and a second element of the cell chip of FIG. 3A.
Figure 3C:
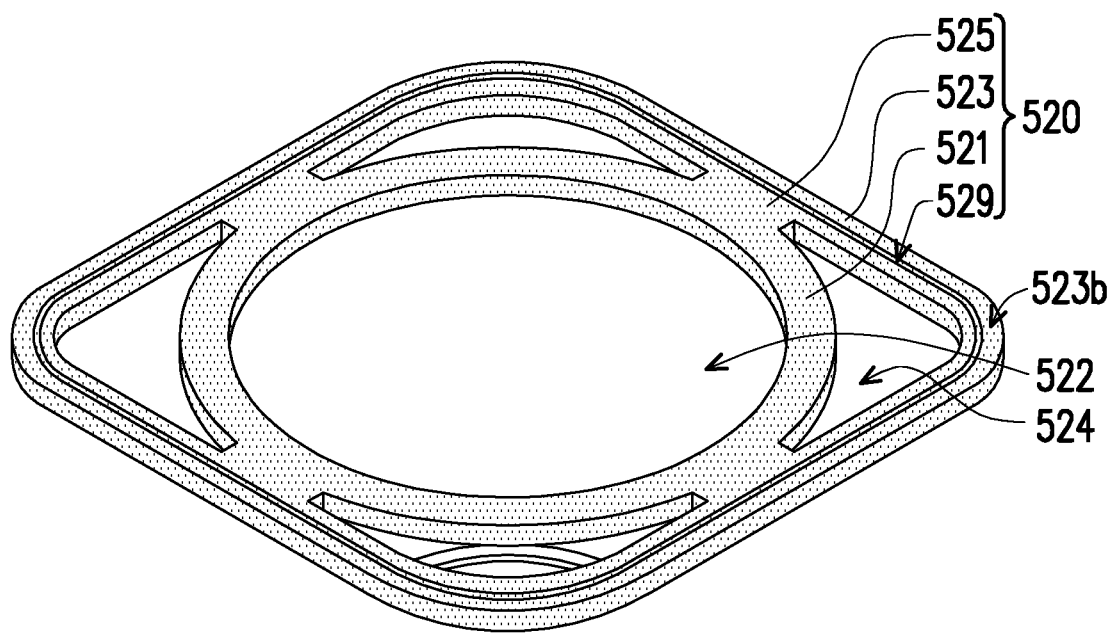
Figure 3D:
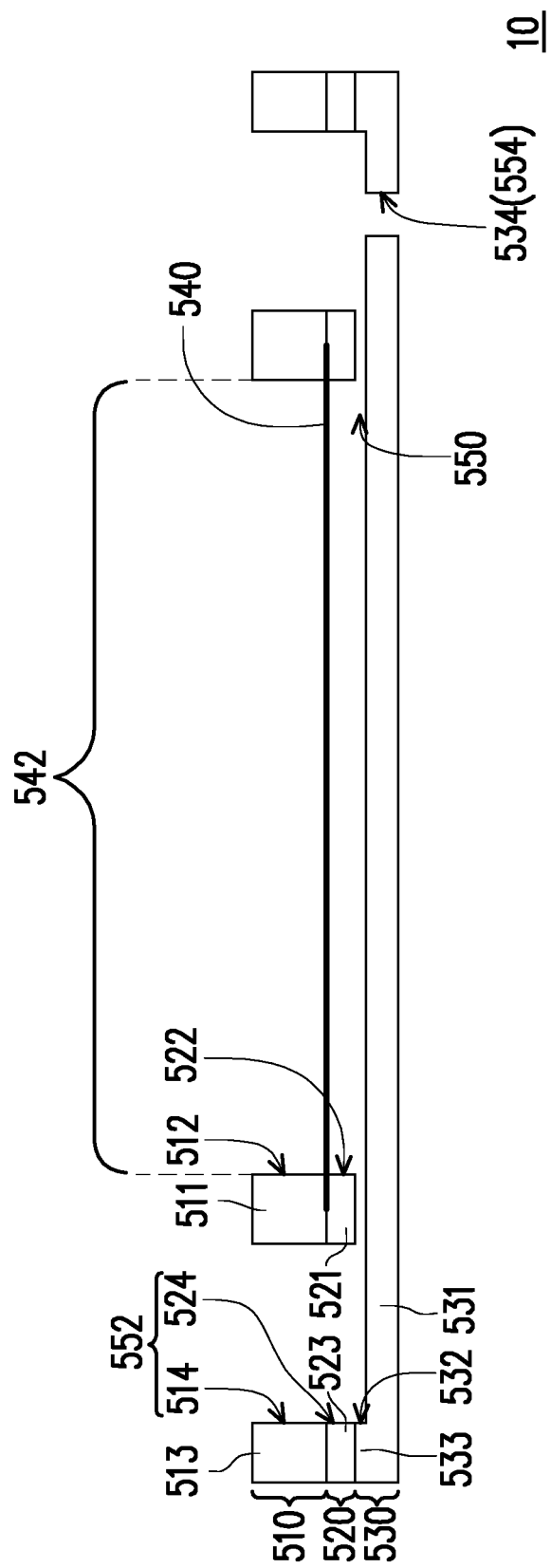
FIG. 3D is a cross-sectional diagram of the cell chip of FIG. 3A along line I-I'.

FIG. 3A is a schematic diagram of a cell chip according to an embodiment of the invention, FIG. 3B is an explosion schematic diagram of the cell chip of FIG. 3A, FIG. 3C is a bottom view of a first element and a second element of the cell chip of FIG. 3A, and FIG. 3D is a cross-sectional diagram of the cell chip of FIG. 3A along line I-I'.

Referring to FIG. 3A to FIG. 3D at the same time, a cell chip 10 includes a first element 510, a second element 520, a third element 530, a dye dialysis layer 540 and a micro-channel structure 550. The first element 510 has an inner part 511, an outer part 513, a connecting part 515 between the inner part 511 and the outer part 513 and at least one first engagement part 517 (shown in FIG. 3D). The outer part 513 surrounds the inner part 511, and the inner part 511 and the outer part 513 are connected to each other through the connecting part 515. In some embodiments, the inner part 511, the outer part 513 and the connecting part 515 are physically connected. The outer part 513 is a square ring, and the inner part 511 is a circular ring, for example. In some alternative embodiments, the connecting part 515 is omitted.

The inner part 511 has at least one first hole 512 therein. In other words, the first hole 512 is formed in the inner part 511 and penetrates the inner part 511. The first hole 512 is a circular hole, for example. A size of the first hole 512 may be in a range of about 3 mm and about 30 mm. For example, the size of the first hole 512 is about 10 mm and about 20 mm. In some embodiments, at least one second hole 514 is formed between the outer part 513 and the inner part 511. For example, the second holes 514 are disposed at four corners of the outer part 513. The first hole 512 is surrounded by the second holes 514. The first hole 512 serves as a sample solution inlet, and the second holes 514 serves as washing solution inlets and/or evaporation holes.

Referring to FIG. 3C, the first engagement part 517 is disposed at a surface of the first element 510 facing the second element 520. In some embodiments, the first engagement part 517 may be disposed in or on a bottom surface 513a of the outer part 513. The first engagement part 517 is a circular groove, for example. However, the disclosure is not limited thereto. In some alternative embodiments, the first engagement part 517 may be other suitable engagement part and/or have other suitable shape.

In some embodiments, the inner part 511, the connecting part 515, the outer part 513 and the first engagement part 517 are integrally formed by an injection molding process, for example. A material of the first element 510 includes cyclic block copolymer (CBC) such as silane-grafted CBCs, maleic anhydride grafted CBCs, acrylate-grafted CBCs, methacrylate-grafted CBCs and siloxanes-grafted CBCs. However, the invention is not limited thereto. In other words, the inner part 511, the connecting part 515, the outer part 513 and the first engagement part 517 may be integrally formed by other suitable process or separately formed and then assembled. In some embodiments, the inner part 511, the connecting part 515 and the outer part 513 have a uniform thickness. The thickness of the inner part 511, the connecting part 515 and the outer part 513 is between 30 mm and 70 mm, for example. A thickness of the inner part 511 is used as a placement region for the sample solution to provide a sufficient volume for the solution required by the dynamic dialysis diffusion.

The second element 520 is then assembled with the first element 510 to hold the dye dialysis layer 540 therebetween. Thus, the second element 520 may have a similar configuration to the first element 510. In some embodiments, the second element 520 has an inner part 521, an outer part 523, a connecting part 525 between the inner part 521 and the outer part 523, at least one second engagement part 527 and at least one third engagement part 529 (shown in FIG. 3C). The outer part 523 surrounds the inner part 521, and the inner part 521 and the outer part 523 are connected to each other through the connecting part 525. In some embodiments, the inner part 521, the outer part 523 and the connecting part 525 are physically connected. The outer part 523 is a square ring, and the inner part 521 is a circular ring, for example. In some alternative embodiments, the connecting part 525 is omitted.

The inner part 521 has at least one third hole 522 therein. In other words, the third hole 522 is formed in the inner part 521 and penetrates the inner part 521. The third hole 522 is disposed corresponding to the first hole 512, and the third hole 522 has the same shape and the same size as the first hole 512. In some embodiments, the third hole 522 is disposed below the first hole 512, and the third hole 522 is a circular hole and has a size in a range of about 3 mm and about 30 mm. For example, the size of the third hole 522 is about 10 mm and about 20 mm. In some embodiments, at least one fourth hole 524 is formed between the outer part 523 and the inner part 521. The third hole 522 is surrounded by the fourth holes 524. The fourth holes 524 are respectively disposed corresponding to the second holes 514, and the fourth holes 524 have the same shape and the same size as the second holes 514. For example, the fourth holes 524 are disposed below the second holes 514. The fourth holes 524 serves as washing solution inlets and/or evaporation holes together with the second holes 514.

Referring to FIG. 3C, the second engagement part 527 is configured to engage with the first engagement part 517.

Thus, the second engagement part 527 is disposed at a surface of the second element 520 facing the first element 510. In some embodiments, the second engagement part 527 may be disposed on a top surface 523a of the outer part 523. The second engagement part 527 may be a circular protrusion which may be engaged with the first engagement part 517. However, the disclosure is not limited thereto. In some alternative embodiments, the first engagement part 517 and the second engagement part 527 may have other engagement configurations.

In addition, the second element 520 is further assemble with the third element 530. Therefore, the second element 520 further includes the third engagement part 529. In some embodiments, the third engagement part 529 is disposed at a surface of the second element 520 facing the third element 530. In some embodiments, the third engagement part 529 may be disposed in or on a bottom surface 523b opposite to the top surface 523a of the outer part 523. The third engagement part 529 may a circular groove. However, the disclosure is not limited thereto. In some alternative embodiments, the third engagement part 529 may have other engagement configurations.

In some embodiments, the inner part 521, the connecting part 525, the outer part 523, the second engagement part 527 and the third engagement part 529 are integrally formed by an injection molding process, for example. A material of the second element 520 includes cyclic block copolymer (CBC) such as silane-grafted CBCs, maleic anhydride grafted CBCs, acrylate-grafted CBCs, methacrylate-grafted CBCs and siloxanes-grafted CBCs. However, the invention is not limited thereto. In other words, the inner part 521, the connecting part 525, the outer part 523, the second engagement part 527 and the third engagement part 529 may be integrally formed by other suitable process or separately formed and then assembled. In some embodiments, the inner part 521, the connecting part 525 and the outer part 523 have a uniform thickness. The thickness of the inner part 521, the connecting part 525 and the outer part 523 is between 0.5 mm and 2 mm, for example.

The third element 530 is then assembled with the second element 520. The third element 530 has an inner part 531, an outer part 533, a plurality of alignment parts 535 and at least one fourth engagement part 537. In some embodiments, the inner part 531 is a square plate, for example. The inner part 531 serves as a base plate of the cell chip 10. In some embodiments, the inner part 531 includes at least one fifth hole 534 therein. The fifth hole 534 is formed in the inner part 531 and penetrates the inner part 531. The fifth hole 534 may be located at any suitable site of the inner part 531. The fifth hole 534 serves as a washing solution outlet, for example. In some embodiments, the outer part 533 surrounds the inner part 531 and has a larger thickness than the inner part 531, and thus an accommodation space 532 is formed. The accommodation space 532 has a height substantially equal to a thickness difference between the outer part 533 and the inner part 531. The outer part 533 has a similar configuration to the outer part 523 of the second element 520. For example, the outer part 533 is a square ring. The alignment parts 535 are disposed on the inner part 531. The alignment parts 535 are separated from each other. The alignment parts 535 may be aligned with portions of the inner part 521 of the second element 520 (also referred to as portions of a periphery of the third hole 522). For example, the alignment part 535 has a curved inner sidewall substantially flush with portions of an inner sidewall of the inner part 521. However, the disclosure is not limited thereto. The alignment part 535 may have other shape. In some embodiments, a thickness of the alignment part 535 may be substantially the same as the outer part 533.

The fourth engagement part 537 is configured to engaged with the third engagement part 529. Thus, the fourth engagement part 537 is disposed at a surface of the third element 530 facing the second element 520. In some embodiments, the fourth engagement part 537 may be disposed on a top surface 533a of the outer part 533. The fourth engagement part 537 may be a circular protrusion which may be engaged with the third engagement part 529. However, the disclosure is not limited thereto. In some alternative embodiments, the third engagement part 529 and the fourth engagement part 537 may have other engagement configurations.

In some embodiments, the inner part 531, the alignment parts 535, the outer part 533 and the fourth engagement part 537 are integrally formed by an injection molding process, for example. A material of the third element 530 includes cyclic block copolymer (CBC) such as silane-grafted CBCs, maleic anhydride grafted CBCs, acrylate-grafted CBCs, methacrylate-grafted CBCs and siloxanes-grafted CBCs. In other words, the inner part 531, the alignment parts 535, the outer part 533 and the fourth engagement part 537 may be integrally formed by other suitable process or separately formed and then assembled. In some embodiments, the inner part 531, the alignment parts 535 and the outer part 533 have a uniform thickness. The depth of the inner part 531 and the thickness of the alignment parts 535 are respectively between 0.1 mm and 0.5 mm, the outer part 533 is between 0.5 mm and 2 mm, for example.

The cell chip 10 is formed by assembling the first element 510, the dye dialysis layer 540, the second element 520 and the third element 530 through the engagement parts 517, 527, 529, 537. In some embodiments, a length of the cell chip 10 is in a range of about 1.5 cm and about 2.5 cm, a width of the cell chip 10 is in a range of about 1.5 cm and about 2.5 cm, and a height of the cell chip 10 is in a range of about 4 mm and about 5 mm, for example.

The dye dialysis layer 540 is inserted between the first element 510 and the second element 520. The dye dialysis layer 540 has a cell-assembly region 542 disposed corresponding to the first hole 512 and the second hole 522. The cell-assembly region 542 includes a plurality of pores (not shown), and the pores are arranged in an array, for example. In the embodiment, a size of the pores is smaller than the particle size of the cell (or the average particle size of multiple cells), such as smaller than or equal to 7 μm. A size of the dye dialysis layer 540 is larger than the size of the first hole 512 and the third hole 522. That is, the size of the dye dialysis layer 540 is between a size of an inner sidewall and a size of an outer sidewall of the inner part 512. A material of the dye dialysis layer 540 is a photoresist, such as SU-8. The dye dialysis layer 540 may be formed by a lithography process with a desired shape. In some embodiments, a thickness of the dye dialysis layer 540 is in a range of about 30 μm to about 60 μm. A pore diameter of the dye dialysis layer 540 is smaller than the particle size of the cell (or the average particle size of multiple cells), such as in a range of about 5 μm to about 10 μm.

After assembling, as shown in FIG. 3A and FIG. 3D, a micro-channel structure 550 is formed between the second element 520 and the third element 530 below the dye dialysis layer 540. Specifically, the micro-channel structure 550 is formed between the alignment parts 535 and the dye dialysis layer 540. The micro-channel structure 550 has a height substantially equal to a thickness difference between the outer part 533 and the inner part 531. In some embodiments, the second hole 512 and the fourth hole 522 are communicatively connected to the micro-channel structure 550, so as to function as a washing solution inlet 552. In some embodiments, the fifth hole 534 is communicatively connected to the micro-channel structure 550, so as to function a washing solution outlet 554. For example, the washing solution enters into the micro-channel structure 550 through the washing solution inlet 552 and leaves the micro-channel structure through the washing solution outlet 554.

Figure 4A:
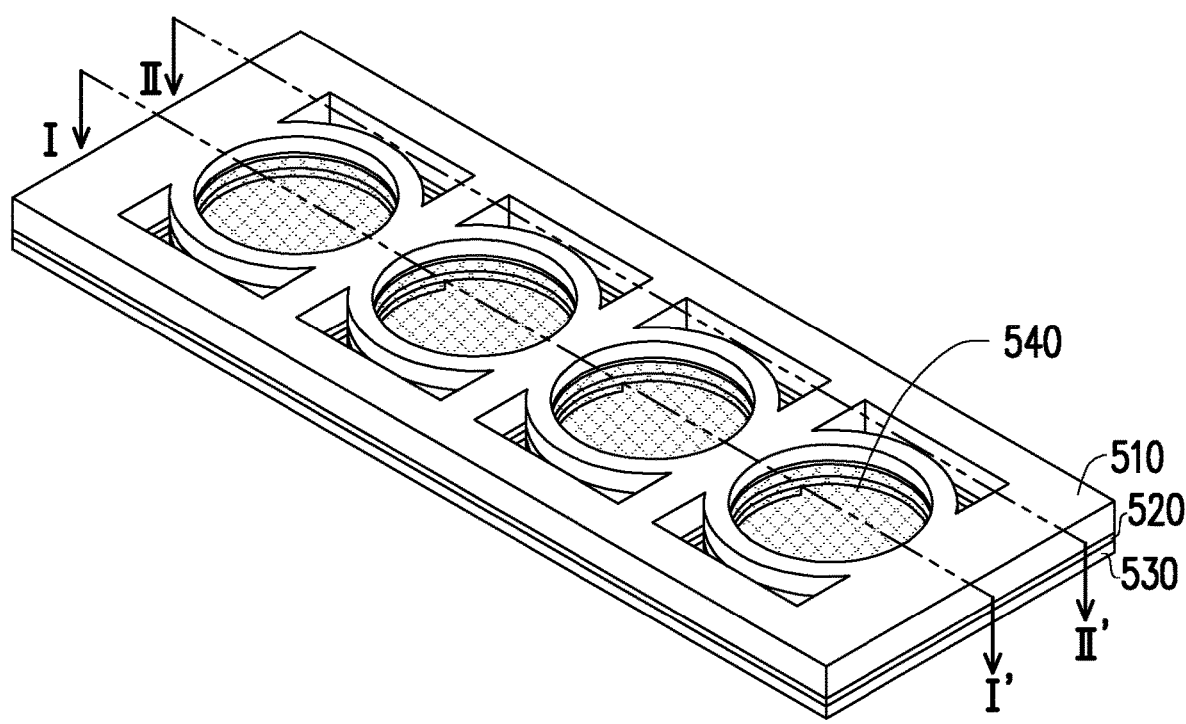
FIG. 4A is a schematic diagram of a cell chip according to an embodiment of the invention.
Figure 4B:
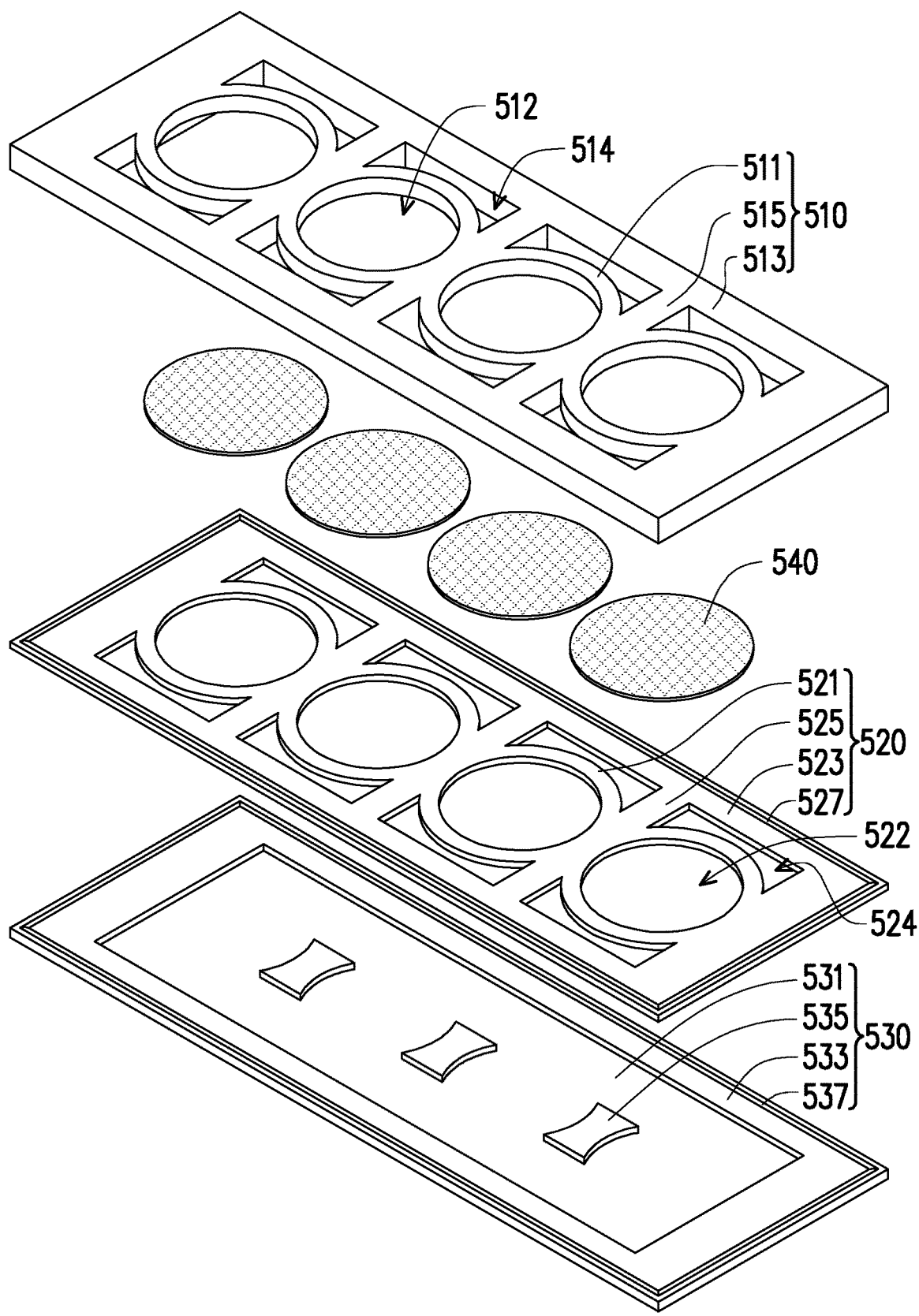
FIG. 4B is an explosion schematic diagram of the cell chip of FIG. 4A.
Figure 4C:
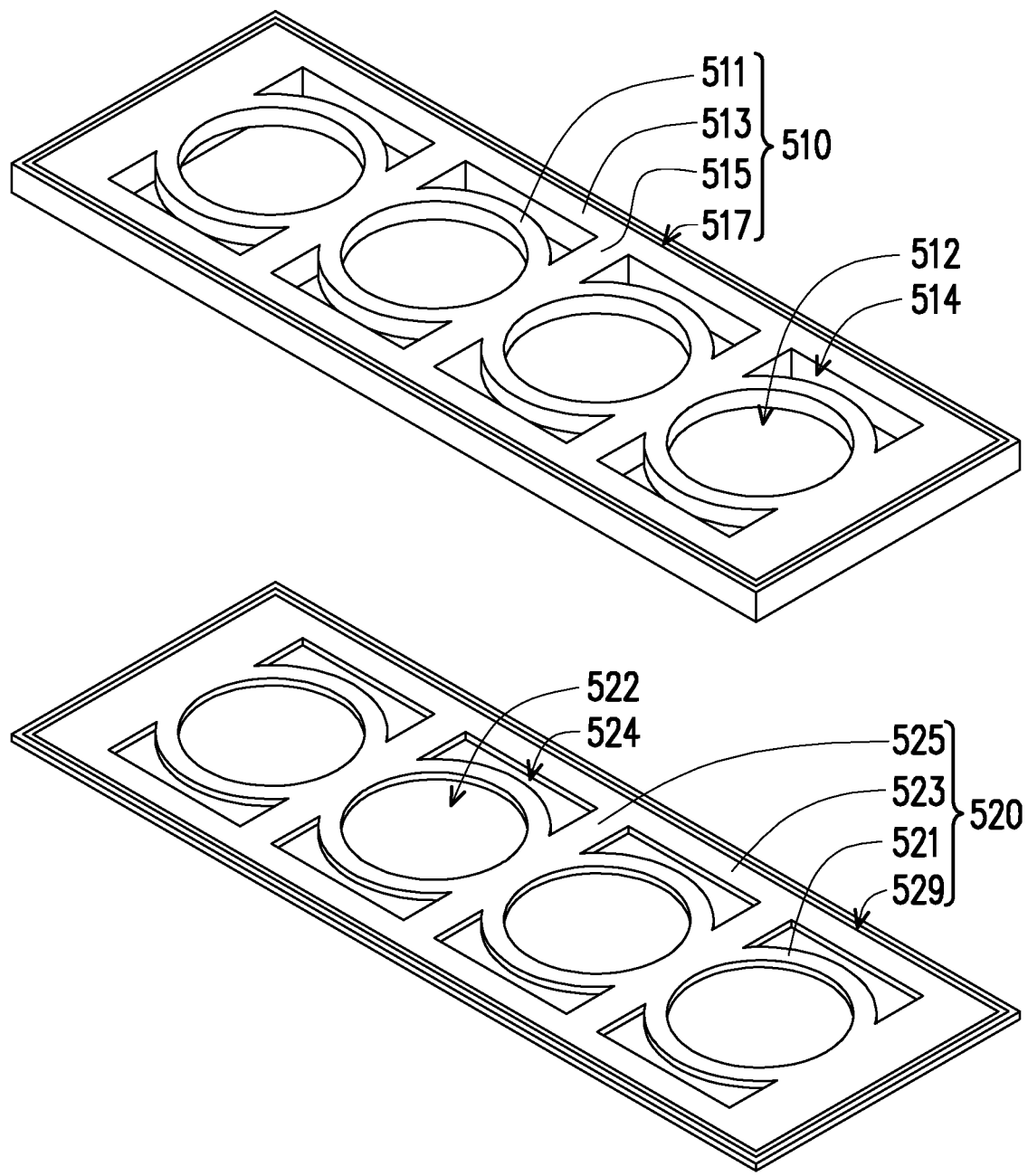
FIG. 4C is a bottom view of a first element and a second element of the cell chip of FIG. 4A.
Figure 4D:
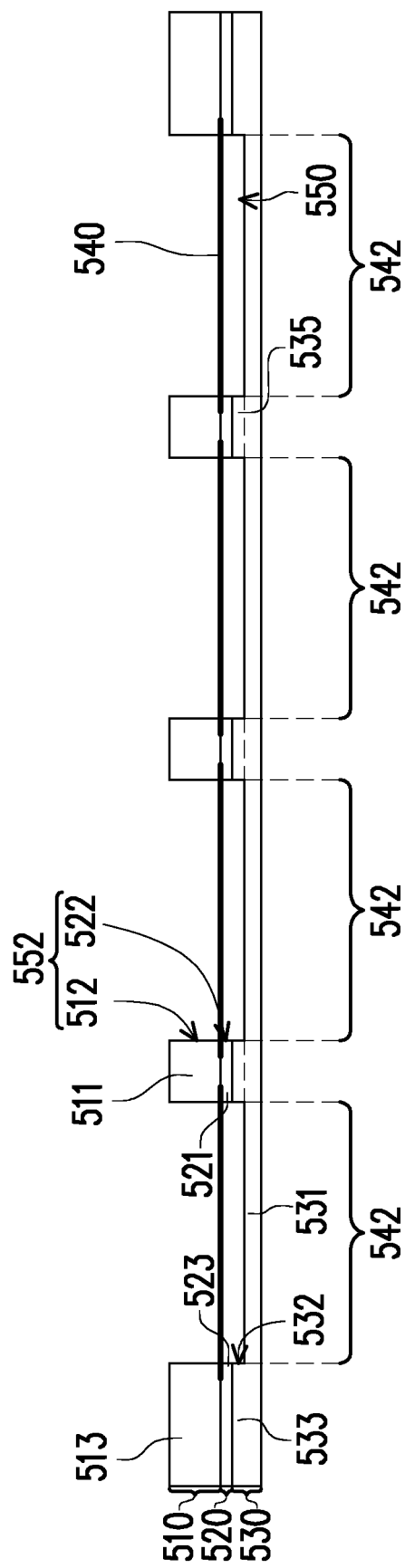
FIG. 4D is a cross-sectional diagram of the cell chip of FIG. 4A along line I-I'.
Figure 4E:
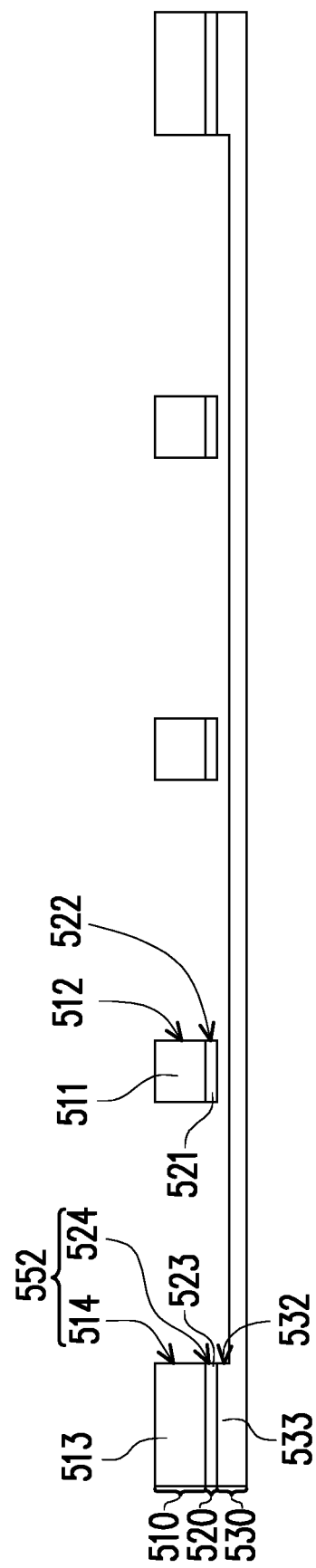
FIG. 4E is a cross-sectional diagram of the cell chip of FIG. 4A along line II-II'.

FIG. 4A is a schematic diagram of a cell chip according to an embodiment of the invention, FIG. 4B is an explosion schematic diagram of the cell chip of FIG. 4A, FIG. 4C is a bottom view of a first element and a second element of the cell chip of FIG. 4A, FIG. 4D is a cross-sectional diagram of the cell chip of FIG. 4A along line I-I', and FIG. 4E is a cross-sectional diagram of the cell chip of FIG. 4A along line II-II'. The cell chip of FIG. 4A is similar to the cell chip of FIG. 3A, the main difference lies the cell chip of FIG. 4A has a plurality of cell-assembly regions. Referring to FIG. 4A to FIG. 4E, in some embodiments, a cell chip 10 includes a first element 510, a second element 520, a third element 530, a dye dialysis layer 540 and a micro-channel structure 550. The first element 510 has an inner part 511, an outer part 513, a connecting part 515 between the inner part 511 and the outer part 513 and at least one first engagement part 517 (shown in FIG. 4C). The outer part 513 surrounds the inner part 511, and the inner part 511 and the outer part 513 are connected to each other through the connecting part 515. The outer part 513 is a square ring, and the inner part 511 includes a plurality of continuous circular rings, for example. In some embodiments, the first element 510 has a plurality of first holes 512 and a plurality of second holes 514. The second holes 514 may be disposed at opposite sides of the first holes 512. In some embodiments, the first holes 512 is formed in the inner part 511, and the second holes 514 are formed between the inner part 511 and the outer part 513. The first engagement part 517 is formed on a surface of the outer part 513. The inner part 511, the connecting part 515, the outer part 513 and the first engagement part 517 may be integrally formed by injection molding process.

The second element 520 is assembled with the first element 510 and has a configuration similar to the first element 510. The second element 520 has an inner part 521, an outer part 523, a connecting part 525 between the inner part 521 and the outer part 523, at least one second engagement part 527 and at least one third engagement part 529. The outer part 523 surrounds the inner part 521, and the inner part 521 and the outer part 523 are connected to each other through the connecting part 525. The outer part 523 is a square ring, and the inner part 521 includes a plurality of continuous circular rings, for example. In some embodiments, the second element 520 has a plurality of third holes 522 corresponding to the first holes 522 and a plurality of fourth holes 524 corresponding to the second holes 524. The second engagement part 527 are configured to engage with the first engagement part 517 of the first element 510, and the third engagement part 529 is disposed in the outer part 523 and configured to engage with a fourth engagement part 527 of the third element 530. The inner part 521, the connecting part 525, the outer part 523, the second engagement part 527 and the third engagement part 529 may be integrally formed by injection molding process.

The third element 530 is assembled with the second element 520. The third element 530 has an inner part 531, an outer part 533, a plurality of alignment parts 535 and the fourth engagement part 537. In some embodiments, the outer part 533 surrounds the inner part 531 and has a larger thickness than the inner part 531, and thus an accommodation space 532 is formed. The inner part 531, the alignment parts 535, the outer part 533, the fourth engagement part 537 may be integrally formed by injection molding process. In some embodiments, the inner part 531 is a square plate, and the outer part 533 is a square ring, for example. The inner part 531 serves as a base plate of the cell chip 10. In some embodiments, the inner part 531 includes at least one fifth hole 534 therein. The fifth hole 534 may be located at any suitable site of the inner part 531. The fifth hole 534 serves as a washing solution outlet, for example. The alignment parts 535 are disposed on the inner part 531 and corresponding to the inner part 521. For example, the alignment parts 535 may be aligned with the location between two adjacent rings of the inner part 521. In some embodiments, the alignment part 535 has opposite curved sidewall substantially flush with portions of peripheries of the adjacent third holes 522. However, the disclosure is not limited thereto.

In some embodiments, a plurality of dye dialysis layers 540 are respectively held between the first element 510 and the second element 520, so as to being disposed between the first hole 512 and the second hole 522. Therefore, a plurality of cell-assembly regions 542 are separately formed. In some alternative embodiments, the cell-assembly regions 542 may be arranged in an array. In some embodiments, as shown in FIGS. 4D and 4E, the micro-channel structures 550 are formed below the dye dialysis layers 540. In addition, as shown in FIG. 4E, the micro-channel structures 550 are connected to each other. In some embodiments, a diameter of the first holes 512 (also a diameter of the cell-assembly regions 542) is in a range of about 3 mm and about 30 mm. In some embodiments, a length of the cell chip 10 is in a range of about 90 mm and about 110 mm, a width of the cell chip 10 is in a range of about 40 mm and about 60 mm, and a height of the cell chip 10 is in a range of about 10 mm and about 15 mm.

Figure 5A:
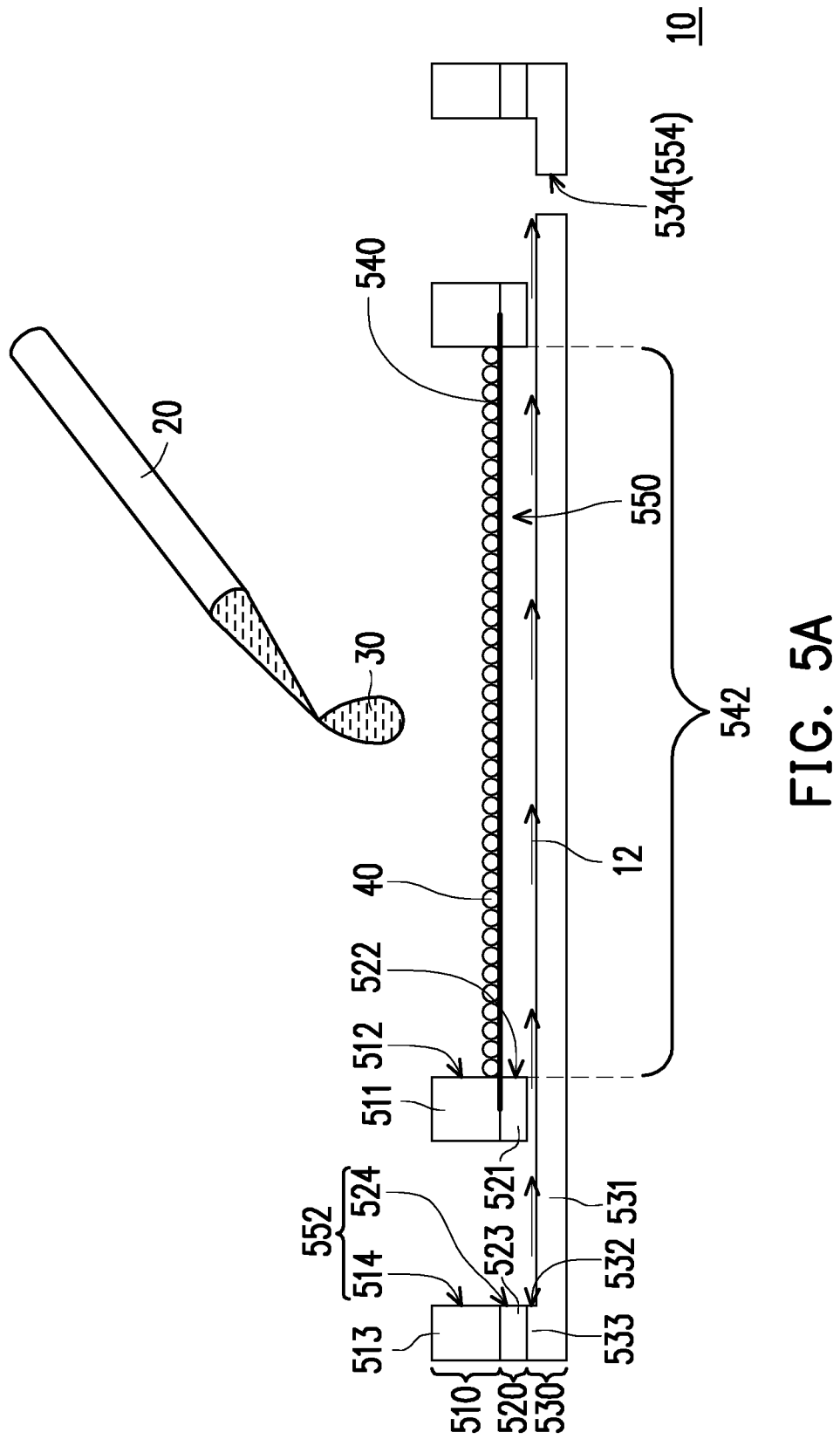
FIG. 5A and FIG. 5B are schematic flow diagrams of a use method for a cell chip according to an embodiment of the invention.
Figure 5B:
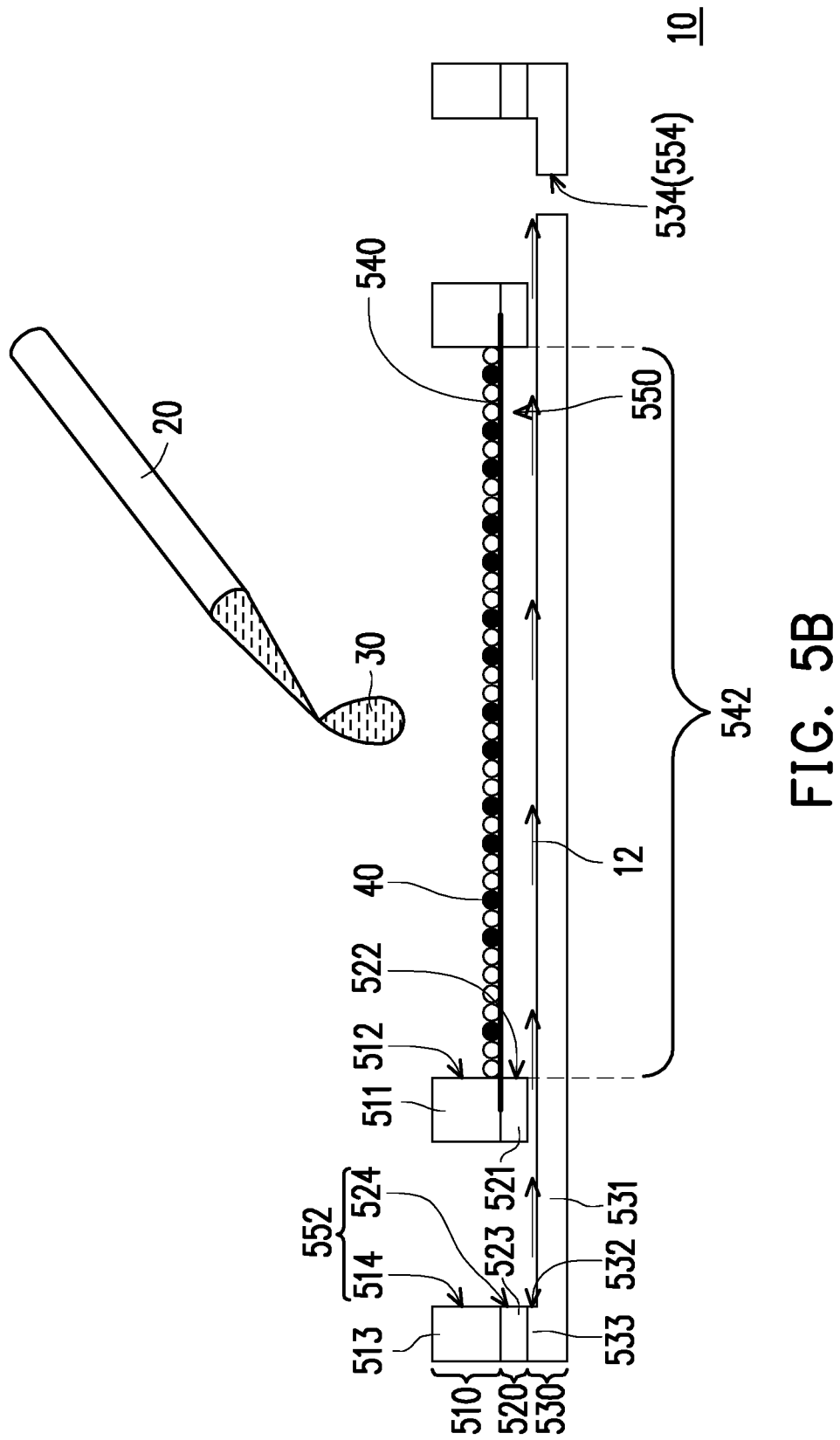

FIG. 5A and FIG. 5B are schematic flow diagrams of a use method for a cell chip according to an embodiment of the invention. Referring to FIG. 5A, first, the cell chip 10 of FIG. 3A is provided. In the embodiment, after the cell chip 10 is provided, the step of establishing a micro-channel system may be performed. That is, a washing solution 12 is injected into the micro-channel structure 550, so that the washing solution 12 continues to flow in the micro-channel structure 550 of the cell chip 10. In some embodiments, the washing solution 12 flows into a region below the dye dialysis layers 540 through gaps between the alignment parts 535. The washing solution 12 is a colorless buffer solution, such as phosphate buffered saline (PBS), for example. In the embodiment, the washing solution 12 may be continuously injected into the micro-channel structure 550 via the washing solution inlet 552 and exhausted from the micro-channel structure 550 via the washing solution outlet 554 by a device, such as a syringe pump (not shown).

Next, a sample solution 30 containing a plurality of cells 40 is dropped into the cell-assembly region 542 of the cell chip 10 via the first hole 512. For instance, the sample solution 30, such as a cell suspension, is sampled by a dropper 20 or a pipetman, and the sample solution 30 is added into the cell chip 10 via the first hole 512. The cells 40 of the sample solution 30 are settled down to the cell-assembly region 542 of the dye dialysis layer 540 by the gravity of the solution and the cells 40 themselves. In the embodiment, the cells 40 are arranged onto the cell-assembly region 542 of the dye dialysis layer 540 in a single layer manner by the lateral tensile force of the evaporation of the solution from the evaporation holes such as the second holes 514 and the fourth holes 524, for example, and the solution of the suspension enters into the micro-channel structure 550 via the second hole 522. In an embodiment, it further includes directly sucking a liquid portion of the sample solution 30 from the evaporation holes such as the second holes 514 and the fourth holes 524 to increase the lateral tensile force, thereby accelerating the cells 40 to be arranged onto the cell-assembly region 542 in a single layer manner. Therefore, the cells 40 in the sample solution 30 are arranged in an array in the cell-assembly region 542 in a self-assembly method to complete the self-assembly with high density cell array. For example, a diameter of the red blood cell is about 7 μm, a diameter of the cell-assembly region 542 is about 1.5 cm, and thus a single layer of RBC includes about 4.6 million cells. Additionally, it should be mentioned that, the pore diameter of the dye dialysis layer 540 is designed to be smaller than the particle size of the cells 40, and thus the dye dialysis layer 540 may prevent the cells from flowing out from the pores therein, so that the loss of the cell number can be avoided, and the liquid such as the liquid portion of the sample solution 30 and the dye diffuses via the dye dialysis layer.

Referring to FIG. 5B, next, a dye 50 is dropped into the cell-assembly region 542 of the cell chip 10 via the first hole 512 to be in contact with the cells 40. While dropping the dye 50, the washing solution 12 flows in the micro-channel structure 550 of the cell chip 10. For instance, the dye 50, such as an immunofluorescent dye, is sampled by a dropper 20 or a pipetman, for example. The dye 50 is added into the cell chip 10 via the first hole 512, so that the dye 50 flows through the cell-assembly region 542 to be in contact with the cells 40 to dye the cells 40. The dye 50 diffuses from the cell-assembly region 542 to the micro-channel structure 550 due to a concentration difference between the dye 50 and the washing solution 12 flowing in the micro-channel structure 550. Thereby, the cells 40 are dyed by the dye 50. The aforementioned concentration difference means not only the concentration difference between the dye just dropped into the cell-assembly region 542 and the washing solution 12 in the micro-channel structure 550, but also the concentration difference between the dye which has been drooped into the cell-assembly region 542 and the dye which has entered into the micro-channel structure 550 to be diluted by the washing solution 12. Additionally, in the embodiment, the washing solution 12 which enters into the micro-channel structure 550 continuously flows in and out the pores of the dye dialysis layer 540 to accelerate the diffusion of the dye, so as to achieve dynamic dialysis staining.

The staining speed of the cells can be significantly accelerated, such as the time of traditional staining is shortened, by the diffusion of the dye and the dynamic dialysis staining method of continuously flowing the washing solution in the micro-channel, so as to complete the cell staining with high efficiency. In the embodiment, the washing solution 12 continuously flowing in the micro-channel structure 550 of the cell chip 10 before dropping the dye 50 is used as an example, but the invention is not limited thereto. In other embodiments, the washing solution 12 may continuously flow in the micro-channel structure 550 of the cell chip 10 while or after dropping the dye 50. It should be mentioned that, if the sample solution is to be specific detected or tested, the sample solution needs to be pretreated prior to the use of the cell chip 10, so as to avoid the additional processing process interfering the cell self-assembly array. Furthermore, to avoid foreign substances affecting cell staining, the cell chip 10 may be covered with an upper cover (not shown) thereon to block the first hole 512.

Then, after the cells 40 are dyed for an appropriate period of time, the cell chip 10 is placed under the optical microscope or the fluorescence microscope to be observed. Since the cells 40 are arranged in an array on the cell-assembly region 542 in a single layer manner before dyeing, the phenomenon of multilayered cells can be eliminated under the observation of the microscope, so that the image interpretation is more accurate. In some alternative embodiments, the cell chip 10 of FIG. 4A is also used to performed the used method as described above.

When a dye enters into the cell-assembly region via the dye dialysis layer, the dye diffuses from the cell-assembly region to the micro-channel structure since there is a concentration difference between the dye and the washing solution flowing in the micro-channel structure, and thus the cells are dyed by the dye, and the washing solution passes in and out via the dye dialysis layer to accelerate the diffusion of the dye, so as to achieve dynamic dialysis staining.

In summary, the cell chip of the invention combines the cell-assembly array chip with the cell staining chip and uses the dye dialysis layer as a platform for carrying the cells and the dye. In the dynamic dialysis staining for cells, since the high efficiency cell staining is achieved by the diffusion and the dynamic dialysis, the disadvantages of the cell loss and cell death in the traditional staining can be reduced, and the method has the advantages of significantly shortening the cell staining time and maintaining cell viability. Additionally, since the cells may be arranged in a single layer manner on the surface of the dye dialysis layer and then dyed, the phenomenon of multilayered cells can be eliminated in the fluorescent image interpretation, so that the image interpretation is more accurate and the detection is more convenient and fast.

Although the invention has been described with reference to the above embodiments, it will be apparent to one of ordinary skill in the art that modifications to the described embodiments may be made without departing from the spirit of the invention. Accordingly, the scope of the invention is defined by the attached claims not by the above detailed descriptions.

What is claimed is:

1. A cell chip, comprising:
    a first element, having at least one first hole and a plurality of second holes surrounding the at least one first hole;
    a second element, having at least one third hole corresponding to the at least one first hole and a plurality of fourth holes corresponding to the plurality of second holes;
    a third element, the second element being disposed between the first element and the third element;
    a dye dialysis layer, inserted between the first element and the second element, and having a cell-assembly region corresponding to the at least one first hole and the at least one third hole, wherein the cell-assembly region is configured to contain a sample solution containing a plurality of cells, and wherein the cell-assembly region includes a plurality of pores;
    a micro-channel structure, disposed below the cell-assembly region and between the second element and the third element,
    a washing solution inlet, including one of the plurality of second holes and a corresponding one of the plurality of fourth holes, and the washing solution inlet is communicatively connected to the micro-channel structure; and
    a washing solution outlet, communicatively connected to the micro-channel structure,
    wherein when a dye enters into the cell-assembly region via the dye dialysis layer, the dye diffuses from the cell-assembly region to the micro-channel structure since there is a concentration difference between the dye and a washing solution flowing in the micro-channel structure through the washing solution inlet and the washing solution outlet, and thus the cells are dyed by the dye, and the washing solution passes in and out via the dye dialysis layer to accelerate the diffusion of the dye, so as to achieve dynamic dialysis staining.

2. The cell chip according to claim 1, wherein the first element, the second element and the third element are respectively an injection molded element.

3. The cell chip according to claim 1, wherein the first element, the second element and the third element are respectively an integrally formed element.

4. The cell chip according to claim 1, wherein the washing solution inlet penetrates the third element.

5. The cell chip according to claim 1, wherein the third element includes an inner part and an outer part surrounding the inner part, and a thickness of the outer part is larger than a thickness of the inner part.

6. The cell chip according to claim 5, wherein a height of the micro-channel structure is substantially the same as a thickness difference between the outer part and the inner part of the third element.

7. The cell chip according to claim 5, wherein the third element further includes a plurality of alignment parts disposed on the inner part.

8. The cell chip according to claim 1, wherein the first element includes a first engagement part, the second element includes a second engagement part, and the first element and the second element are assembled by engaging the first engagement part and the second engagement part.

9. The cell chip according to claim 8, wherein the first engagement part and the second engagement part are a protrusion and a groove.

10. The cell chip according to claim 1, wherein the second element includes a third engagement part, the third element includes a fourth engagement part, and the second element and the third element are assembled by engaging the third engagement part and the fourth engagement part.

11. The cell chip according to claim 10, wherein the third engagement part and the fourth engagement part are a protrusion and a groove.

12. The cell chip according to claim 1, wherein a pore diameter of the cell-assembly region is smaller than a diameter of the cells.

13. The cell chip according to claim 1, wherein the plurality of second holes are disposed at four corners of the first element to surround the at least one first hole.

14. The cell chip according to claim 1, wherein a material of the dye dialysis layer includes a photoresist.

15. The cell chip according to claim 1, wherein the at least one first hole is a circular hole.

16. A dynamic dialysis staining for cells, comprising:
    providing the cell chip according to claim 1;
    dropping a sample solution containing a plurality of cells into the cell-assembly region of the cell chip via the at least one first hole; and
    dropping a dye into the cell-assembly region of the cell chip via the at least one first hole to be in contact with the cells, wherein when dropping the dye, a washing solution flows in the micro-channel structure of the cell chip, the dye diffuses from the cell-assembly region to the micro-channel structure since there is a concentration difference between the dye and the washing solution flowing in the micro-channel structure, and thus the cells are dyed by the dye, and the washing solution passes in and out the cell chip via the dye dialysis layer to accelerate the diffusion of the dye, so as to achieve dynamic dialysis staining.

17. The dynamic dialysis staining for cells according to claim 16, wherein after dropping a sample solution containing a plurality of cells into the cell-assembly region of the cell chip via the at least one first hole, further comprising sucking a liquid portion of the sample solution via at least one of the plurality of second holes and a corresponding one of the plurality of fourth holes, so that the cells are arranged on the cell-assembly region in a single layer manner.

18. The dynamic dialysis staining for cells according to claim 16, wherein a pore diameter of the cell-assembly region is smaller than a diameter of the cells.

19. The dynamic dialysis staining for cells according to claim 16, wherein a material of the dye dialysis layer includes a photoresist.

\* \* \* \* \*